Figure 1:
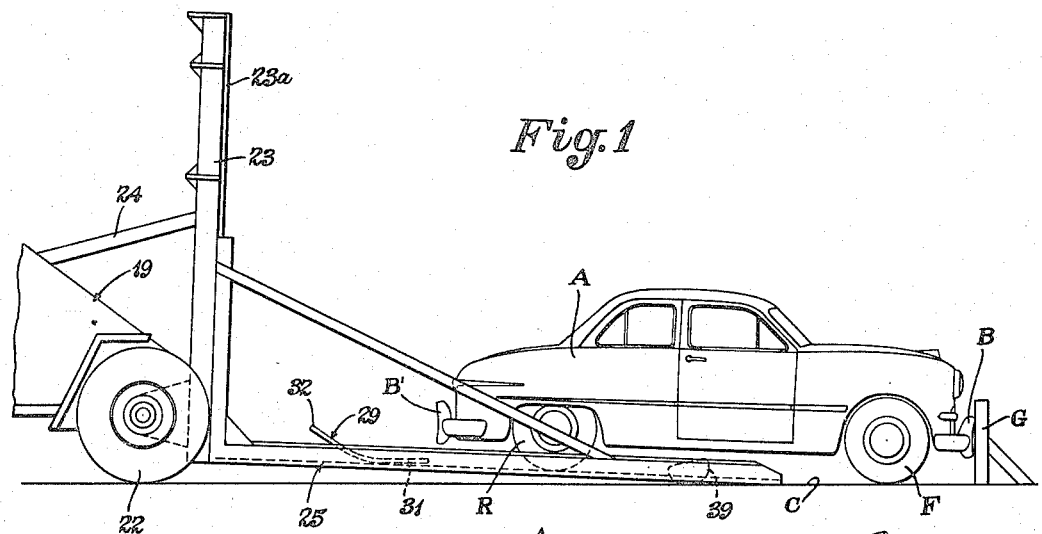

Feb. 7, 1956 — F. H. EVANS — 2,733,825
VEHICLE PARKING APPARATUS
Filed Nov. 5, 1951 — 3 Sheets-Sheet 1

INVENTOR.
Frederick H. Evans
BY
Frease, Bishop & Hamilton
ATTORNEYS

Feb. 7, 1956 F. H. EVANS 2,733,825
VEHICLE PARKING APPARATUS
Filed Nov. 5, 1951 3 Sheets-Sheet 2

INVENTOR.
Frederick H. Evans
BY
Frease, Bishop & Hamilton
ATTORNEYS

United States Patent Office 2,733,825
Patented Feb. 7, 1956

2,733,825

VEHICLE PARKING APPARATUS

Frederick H. Evans, Massillon, Ohio, assignor to Evans Enterprises, Inc., Massillon, Ohio, a corporation of Ohio Application November 5, 1951, Serial No. 254,879

8 Claims. (Cl. 214—672)

The invention relates to means for parking automobiles in a manner that will greatly increase the capacity of automobile parking lots and will, at the same time, incorporate in outdoor parking lots the desirable features of indoor parking.

In recent years, the rapid development of motor traffic has caused such congestion, particularly in the business sections of most cities, that traffic regulations have become necessary, prohibiting the parking of automobiles in the streets, especially in such congested areas, for longer than a limited period of time.

This has necessitated the provision of parking places, in or near such areas, where drivers may leave their cars for any required period of time, while engaged in their daily work, or in other business transactions, in such districts of a city.

The two expedients most commonly resorted to in an attempt to solve this problem are automobile parking lots, and public garages. Both of these methods are far from satisfactory, and neither of them is capable of utilizing the maximum area for parking purposes, for the reason that both of them require an impracticably large area for moving and handling vehicles to place them in the parking areas or remove them therefrom.

In automobile parking lots cars can be parked only on the ground level, and, in an effort to utilize as much of the ground space as possible, it is customary in many parking lots to park vehicles, bumper to bumper, in several rows. This often results in considerable annoyance and inconvenience to drivers who are required to wait an unreasonable length of time to get their cars from the lot, while one or more attendants are moving several other cars before they can remove any desired car from the parking place.

Furthermore, these open parking lots afford no protection for automobiles, leaving them exposed to the elements for long periods of time in all kinds of weather.

The usual parking garage comprises a building several stories high, and, in order to move the vehicles from one floor to another, ramps are provided, which occupy a considerable amount of floor space, and further, valuable floor space is wasted upon each floor in order to maneuver vehicles into and out of parked position. In such garages also, the manner of handling vehicles in parking them and returning them to the drivers, consumes so much time as to cause inconvenience and delay to the drivers waiting for the return of their cars.

It is therefore an object of the present invention to provide a method and apparatus for outdoor parking of automobiles, which greatly increases the parking capacity and avoids the undesirable features of both indoor and outdoor parking facilities, while including the desirable features of indoor parking.

Another object is to provide a plurality of cubicles, each of a size to accommodate one automobile, which are detachably connected together in superposed tiers or courses, in such arrangement as will best utilize the ground area available.

A further object is to provide for moving automobiles into and out of the cubicles by means of a standard fork lift truck, provided with an upright mast and having vertically, movably mounted thereon, in place of the usual lift fork, a scoop or platform of suitable dimensions to receive an automobile thereon, the scoop being arranged to be tilted to forwardly and rearwardly inclined positions and provided at its side edges with curbs for wheel alignment.

A still further object of the invention is to provide automatic safety stops upon the scoop, and within the cubicles, to prevent the accidental displacement of a vehicle while being moved upon the lift truck, or while stored in a cubicle.

Figure 2:
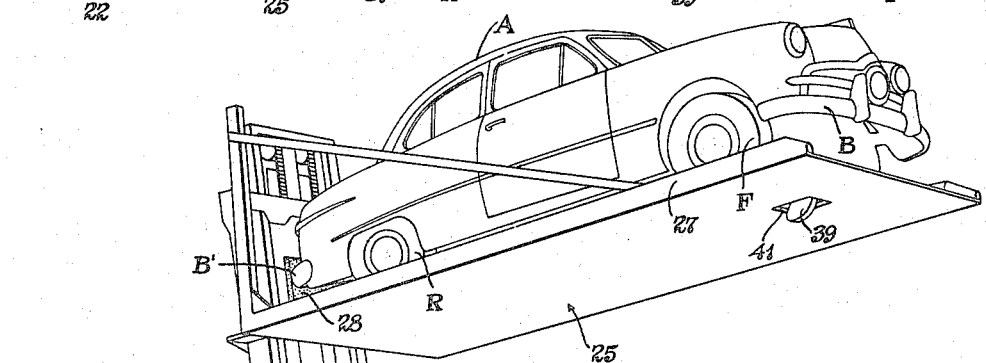
Figure 4:
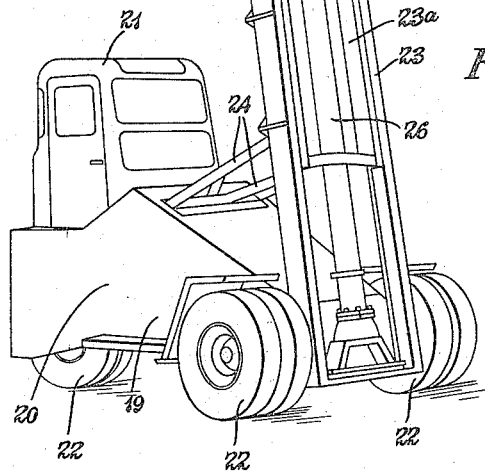
Figure 4:
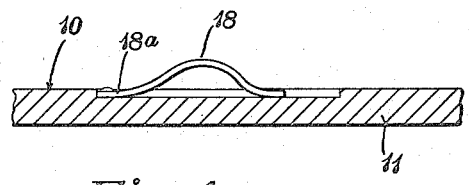
Figure 3:
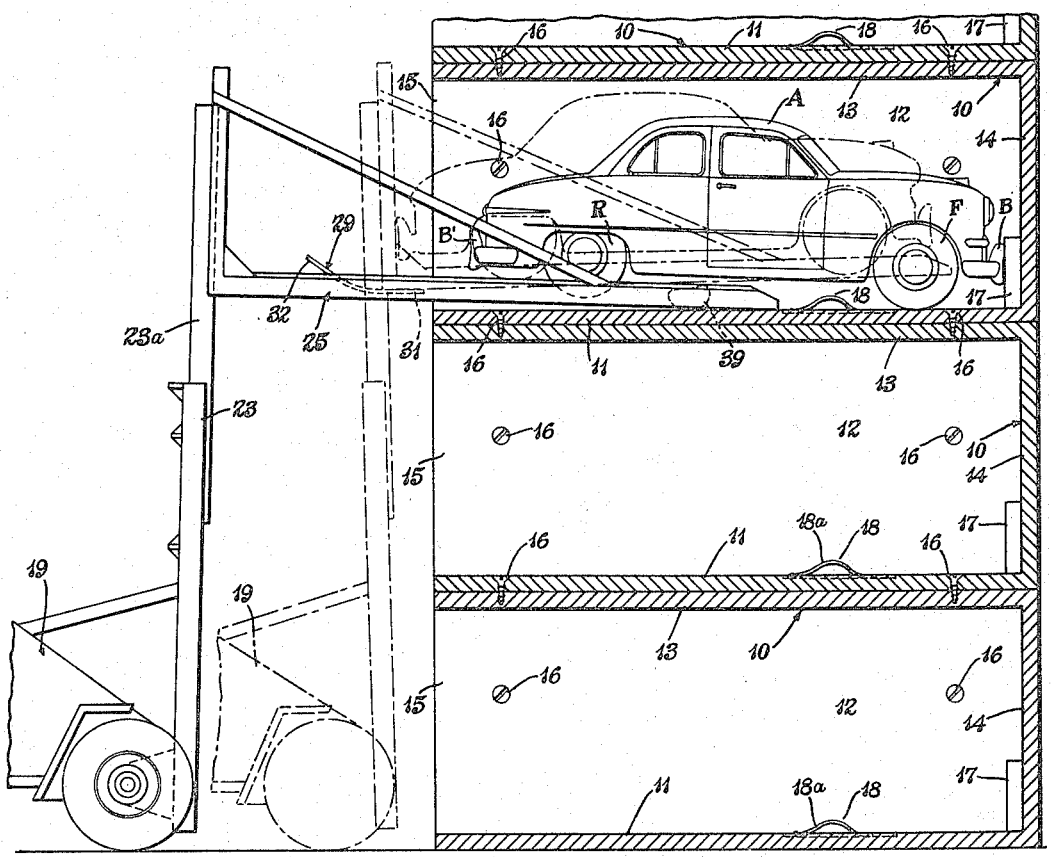
Figure 6:
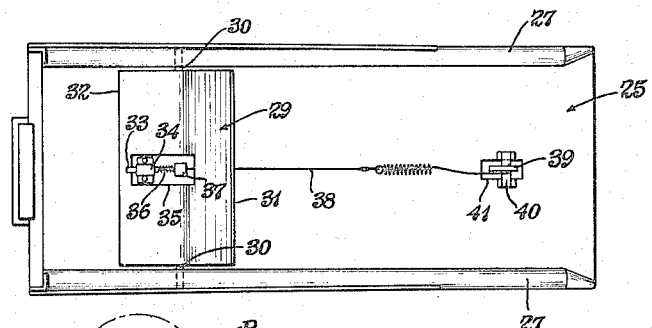
Figure 5:
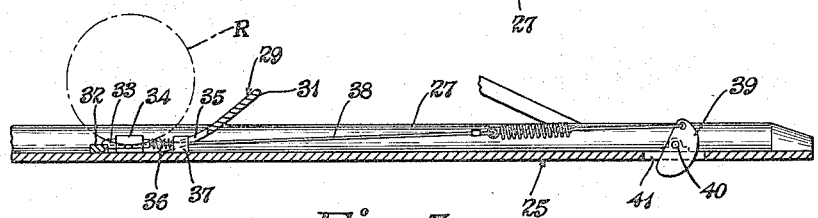
Figure 7:
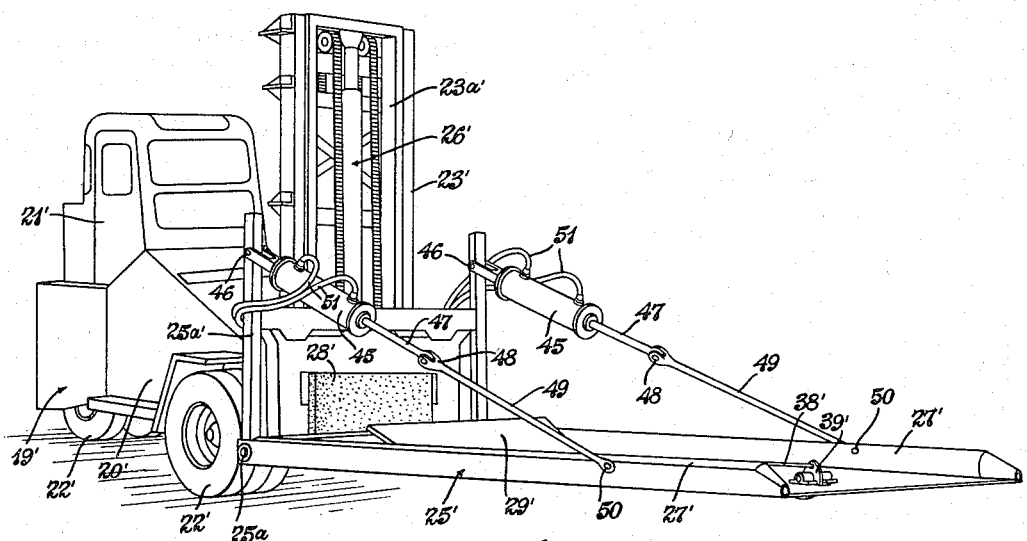
Figure 8:
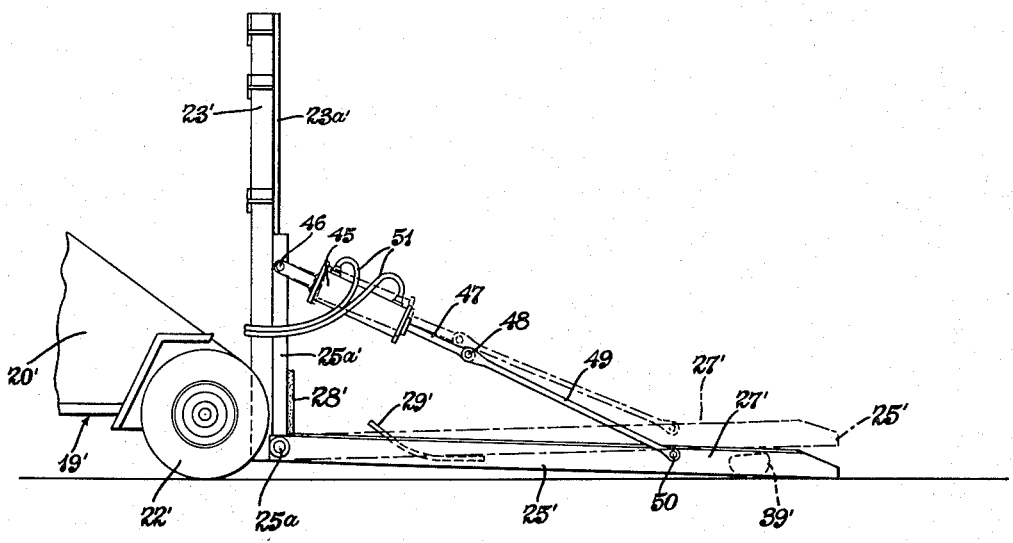

The above and other objects, apparent from the drawings and following description may be attained, the above described difficulties overcome and the advantages and results obtained, by the apparatus, construction, arrangement and combinations, subcombinations, parts and methods of operation which comprise the present invention, a preferred embodiment of which, illustrative of the best mode in which applicant has contemplated applying the principle, being set forth in detail in the following description and illustrated in the accompanying drawings, in which:

Fig. 1 is a side elevation of a lift truck with tilting mast, provided with a scoop constructed in accordance with the invention, showing the scoop in lowered position, so as to be inserted beneath the wheels of an automobile;

Fig. 2 a perspective view of the lift truck with the mast tilted backward and the scoop in raised position upon the mast and rearwardly inclined, showing an automobile carried upon the scoops for transportation to or from a cubicle;

Fig. 3 a vertical, longitudinal, sectional view through a plurality of superposed cubicles, showing the manner in which an automobile is transferred from the scoop of the lift truck to a cubicle, or removed therefrom;

Fig. 4 a longitudinal, vertical, sectional view through a portion of a cubicle, showing the automatic safety stop therein for preventing accidental displacement of an automobile therefrom;

Fig. 5 an enlarged, longitudinal, sectional view through the scoop, showing the automatic safety stop thereon;

Fig. 6 a top plan view of the scoop, showing the automatic safety stop;

Fig. 7 a perspective view of a type of lift truck with rigid, vertical mast and the scoop hingedly connected to a member vertically movable upon the mast with means for tilting the scoop to forwardly and rearwardly inclined positions; and, Fig. 8 a fragmentary side elevation of the lift truck shown in Fig. 7, showing the scoop tilted to forwardly inclined position and in broken lines tilted to rearwardly inclined position.

Similar numerals refer to similar parts throughout the drawings.

The apparatus to which the invention pertains comprises generally vehicle storage means, and vehicle handling and transporting means for placing vehicles in the storage means and removing them therefrom.

For the purpose of storing the vehicles in a manner to protect them from the weather, individual cubicles or stalls are provided, each cubicle being of suitable length, width and height to accommodate one automobile, as indicated generally at 10 in Fig. 3.

These cubicles may be constructed of wood, plywood, metal, concrete, or any combination of these, or other suitable materials, and each cubicle comprises the bottom wall 11, side walls 12, top wall 13, and one end wall 14, the opposite end being open, as indicated at 15, to permit vehicles to be moved therethrough into and out of the cubicle.

In assembling the cubicles to provide a parking area, they are placed side by side in such arrangement as best utilizes the ground area of the particular property, and in courses, or tiers, preferably four high, as shown in Fig. 3, and may be detachably connected together by any suitable means, such as the screws 16, which permits of the cubicles being easily and readily connected together or detached and moved to a different location, if desirable or necessary.

An end guard rail or bumper 17 may be located within the closed end of each cubicle, for contact with the front bumper of an automobile parked therein, and for the purpose of preventing a vehicle from accidentally rolling out of the cubicle, automatic spring wheel stops 18 are provided for normally engaging behind the front wheels of the vehicle. Each stop may be in the form of an arcuate leaf spring attached at one end to a wall of the cubicle as indicated at 18a.

The vehicle handling and transporting means comprises a lift truck from which the conventional lift fork is eliminated and a tilting scoop or platform is substituted therefor, of sufficient dimensions to receive an automobile thereon. Such scoop is designed to be tilted to forwardly and rearwardly inclined positions relative to the truck.

This tilting of the scoop may be accomplished in various manners. Where the lift truck is of a standard type having a rigid mast, the scoop may be hingedly or pivotally mounted upon a member which is vertically movable upon the mast, and means is provided for tilting the scoop relative to the mast.

Another standard type of lift truck is provided with a mast hinged or pivoted at its lower end, with means for tilting the mast forwardly and rearwardly from the vertical. In such case the scoop may be tilted to forwardly and rearwardly inclined positions by the tilting of the mast.

The invention is illustrated and described as applied to both types of lift trucks above referred to. In Figs. 1 to 6 inclusive the vehicle handling and transporting means is illustrated as a lift truck with tilting mast, such lift truck being indicated generally at 19 in Figs. 1, 2 and 3.

This lift truck includes the body 20, with a cab 21, and houses usual motive means (not shown) for propelling the truck over the ground by means of the traction wheels 22. This lift truck is of a usual type having an upright mast 23, pivotally mounted at its lower end upon the body portion 20 of the truck, and adapted to be tilted forwardly and rearwardly, as by means indicated at 24, which are operated by the motive means of the truck.

Instead of being provided with the conventional lift forks, this truck has a specially designed scoop, indicated generally at 25, mounted for vertical movement upon the mast 23, as by suitable operating means indicated generally at 26 for raising and lowering the movable section 23a of the mast.

The scoop 25 may be formed of metal, or other suitable material, and is of sufficient length and width to receive an automobile thereon, as shown in the drawings, and is provided at its longitudinal edges with the curbs 27 for wheel alignment of the vehicle supported thereon.

An abutment or bumper 28 may be provided at the rear end of the scoop 25, for contact by the rear bumper of a vehicle carried upon the scoop, to limit the rearward movement of the vehicle upon the scoop.

For the purpose of preventing a vehicle from moving forwardly off of the scoop, an automatic stop, indicated generally at 29, is provided upon the scoop for engagement in front of the rear wheels of the vehicle.

This automatic stop is shown as comprising an angular or curved plate, pivotally mounted upon the scoop as by the pintles 30 journalled in the curbs 27, and so located upon the scoop as to engage in front of the rear wheels of a vehicle carried thereby.

The plate 29 is so proportioned and balanced that it will normally rest in the position shown in Figs. 1 and 3 with the forward end portion 31 thereof resting upon the bottom of the scoop and the rear end portion 32 thereof elevated.

With the plate 29 in this position, as the rear wheels indicated at R, of an automobile, indicated at A, pass rearwardly thereover, they will tilt the plate upon its pivotal points 30 so that the rear end portion 32 thereof rests upon the bottom of the scoop and the forward end portion 31 thereof is tilted upward in front of the rear wheels R of the vehicle, as indicated in Fig. 5, providing a stop to prevent the vehicle from accidentally rolling forwardly off of the scoop.

For the purpose of holding the plate 29 in this position, while a vehicle is mounted upon the scoop, a latch 33 is provided. This latch is longitudinally slidably located through a housing 34, fixed upon the bottom of the scoop 25, within a slot 35 in the plate 29, and adapted to engage over the top of the plate at the rear end of said slot, as shown in Figs. 5 and 6.

The latch 33 is normally urged rearward to the locking position as by the coil spring 36, interposed between the latch 33 and a lug or block 37 upon the bottom of the scoop. The latch 33 is adapted to be operated by means of a wire or rod 38 connected to the latch and to the operating lever 39, which is fulcrumed as at 40 through a slot 41 in the bottom of the scoop, near the forward end thereof.

In the operation of the type of lift truck shown in Figs. 1, 2 and 3, for parking or delivering parked vehicles to the drivers, a vehicle that is driven into the lot for parking is directed to a portion of the lot that is surfaced with concrete or other hard material, as indicated at C, sloping slightly toward a guard rail G, toward which the car is allowed to drift until the front bumper B thereof engages the guard rail.

The ignition is turned off, the control is shifted to neutral position and the brakes are released. The driver then leaves the car and receives a claim check for the same. The lift truck above described then approaches the parked automobile from the rear and lowers the scoop 25 upon the surface C to a position against the rear wheels R of the automobile.

The operator of the lift truck then moves the truck forwardly toward the car, passing the scoop 25 under the rear wheels thereof, as shown in Fig. 1, and then under the front wheels F, the wheels revolving with the forward movement of the scoop.

With the scoop 25 in contact with the surface C, it will be seen that the lever 39 is rocked in clockwise direction, as viewed in the drawings, holding the latch 33 in unlocked position. As the scoop 25 is moved forwardly beneath the vehicle A, the rear wheels R of the vehicle will pass over the plate 29 rolling it into the operative position, shown in Figs. 5 and 6 with the forward end portion 31 of the plate projecting upward in front of the rear wheels R of the vehicle.

When the scoop has been passed under the front wheels F of the vehicle, the mast 23 of the lift truck is tilted backward, tilting the scoop 25 rearwardly and downwardly so that the vehicle will roll back upon the scoop until the rear bumper B' contacts the abutment 28 at the rear end of the scoop.

As the forward end of the scoop 25 is thus raised out of contact with the surface C, the lever 39 will be permitted to assume the normal position as shown in Fig. 5, the spring 36 forcing the latch 33 over the top of the plate 29 at the rear end of the slot 35 therein, as shown in Figs. 5 and 6, thus latching the automatic stop plate 29 in operative position in front of the rear wheels R of the vehicle.

With the mast in rearwardly tilted position, the scoop 25 may then be raised upon the mast to a position that it will clear pedestrian or other traffic, as shown in Fig. 2, and the lift truck with the vehicle thereon is moved to the most convenient vacant cubicle 10.

The scoop 25 is positioned laterally and vertically relative to the cubicle and the truck is then moved forwardly inserting the scoop, with the vehicle thereon, into the cubicle, as shown in broken lines in Fig. 3.

While the scoop is being inserted into the cubicle, the mast 23 of the lift truck is tilted forwardly so that the forward end of the scoop rests upon the bottom wall of the cubicle, and the sliding of the forward end of the scoop upon the floor of the cubicle will flatten the stop springs 18.

As the lever 39 contacts the floor of the cubicle it will release the latch 33 permitting the stop plate 29 to drop to the position shown in Fig. 3 and the vehicle is allowed to roll forward until the front bumper B thereof contacts the guard rail 17 of the cubicle.

As the lift truck is backed away from the cubicle with the scoop 25 remaining forwardly tilted, the stop springs 18 will automatically return to normal position at the rear of the front wheels F, holding the vehicle against rearward movement as the scoop is withdrawn from under the rear wheels thereof and from the cubicle.

When the vehicle is called for by its driver, the lift truck is moved to the cubicle in which the vehicle is stored and the scoop is positioned laterally and vertically so as to permit it to enter the cubicle.

With the mast 23 in slightly forward tilted position so that the front end of the scoop rests upon the floor of the cubicle, the truck is moved forwardly, moving the scoop into the cubicle and passing it first under the rear wheels R and then under the front wheels F thereof. The lever 39 will have been operated to hold the latch 33 in retracted position during this time.

With the scoop fully inserted into the cubicle, the mast 23 is then tilted backward, allowing the vehicle to roll against the abutment 28 at the rear end of the scoop and permitting the lever 39 to return to normal position, as shown in Figs. 5 and 6, latching the stop plate 29 in operative position in front of the rear wheels R of the vehicle.

The lift truck is then backed away from the cubicle, withdrawing the scoop with the vehicle thereon from the cubicle, and the truck is moved to an exit area arranged in the same manner as the entrance area shown in Fig. 1.

Arriving at the exit area, the scoop is lowered to the ground surface, which action operates the lever 39 to retract the latch 33. The mast 23 is then tilted slightly forwardly, permitting the vehicle to roll forwardly of its own momentum until the front bumper B thereof contacts a guard rail or abutment, similar to the guard rail shown in Fig. 1.

Maintaining the mast in slightly tilted position the lift truck is then moved backward withdrawing the scoop from beneath the wheels of the vehicle, which is then available for the driver.

In Figs. 7 and 8 is shown an application of the invention to a type of lift truck in which the mast remains in vertical position and the scoop is hinged relative to the mast, whereby the scoop may be tilted to forwardly and rearwardly inclined position while the mast remains in vertical position. Otherwise the construction of the lift truck may be substantially the same as shown in Figs. 1 to 6 and above described.

Referring now more specifically to the construction illustrated in Figs. 7 and 8, the lift truck is indicated generally at 19' and includes the body 20' with cab 21' and may be propelled over the ground by means of the traction wheels 22'.

The upright mast 23' is rigidly mounted to remain in vertical position and provided with the vertically movable section 23a' which may be operated by the usual operating means indicated generally at 26'.

The scoop, indicated generally at 25', is hinged or pivotally connected as at 25a to a member 25a' mounted for vertical movement upon the mast. Otherwise this scoop is of the same construction and arrangement as the scoop 25 shown in Figs. 1 to 6 and is provided at its longitudinal edges with the curbs 27' for aligning the wheels of a vehicle supported thereon.

An abutment or bumper 28', which may be in the form of a block of rubber or the like, similar to the bumper 28 above referred to, may be located at the rear end of the scoop for contact by the rear bumper of a vehicle carried thereon.

An automatic stop 29', of the same construction as the automatic stop 29 above described, is provided upon the scoop for engagement in front of the rear wheels of a vehicle and provided with a latch adapted to be automatically operated through a cable 38' and lever 39' in the manner above described in detail.

The scoop 25' may be tilted to forwardly and rearwardly inclined position by means of the fluid cylinders 45 pivotally connected to the member 25a' as indicated at 46, and provided with piston rods 47 which may be pivotally connected, as at 48, to the links 49 which are pivotally connected, as at 50, to the scoop 25'. Fluid for operating the pistons within the cylinders 45 may be admitted to the cylinders through the hose lines 51.

It will be obvious that with the scoop 25' in forwardly inclined position, as shown in full lines in Fig. 8, the admission of fluid to the forward ends of the cylinders 45 will retract the pistons therein and, through the piston rods 47 and links 49, the scoop may be tilted to rearwardly inclining position, as shown in broken lines in said figure, and that by admitting fluid to the rear ends of the cylinders 45 the scoop may again be returned to the forwardly inclined position.

The operation of the type lift truck shown in Figs. 7 and 8 for parking or delivering parked vehicles to the drivers, will be the same as above described in detail, with the exception that the scoop will be tilted by the hydraulic means shown in Figs. 7 and 8, while the mast remains in vertical position.

In the foregoing description, certain terms have been used for brevity, clearness, and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. In vehicle storing means having storage compartments, a common carrier for selectively transporting vehicles to and from the compartments, said common carrier comprising a lift truck having an upright mast, a scoop vertically movable upon the mast, the scoop extending forwardly from the mast and being of sufficient size to receive an automobile thereon, an angular stop plate pivotally mounted upon the scoop and adapted to be tilted to operative position by a wheel of the vehicle passing thereover, a spring loaded latch bolt mounted upon the scoop and adapted to normally engage over the rear end of the stop plate when the stop plate is in operative position, an operating lever fulcrumed intermediate its ends upon the scoop, the lower end of said operating lever normally projecting below the bottom of the scoop, and a link connecting said latch bolt to the upper end of said operating lever for automatically releasing the latch bolt when the bottom of the scoop is moved into contact with a horizontal surface, means for moving the scoop vertically upon the mast and means for tilting the scoop to forwardly and rearwardly inclined positions.

2. In a vehicle storing means having storage compartments, a common carrier for selectively transporting vehicles to and from the compartments, said common carrier comprising a lift truck having an upright mast, a scoop vertically movable upon the mast, the scoop extending forwardly from the mast and being of sufficient size to receive an automobile thereon, curbs upon the longitudinal edges of the scoop for wheel alignment of an automobile, an annular stop plate pivotally mounted upon the scoop and adapted to be tilted to operative position by a wheel of the vehicle passing thereover, a spring loaded latch bolt mounted upon the scoop and adapted to normally engage over the rear end of the stop plate when the stop plate is in operative position, an operating lever fulcrumed intermediate its ends upon the scoop, the lower end of said operating lever normally projecting below the bottom of the scoop, and a link connecting said latch bolt to the upper end of said operating lever for automatically releasing the latch bolt when the bottom of the scoop is moved into contact with a horizontal surface, means for moving the scoop vertically upon the mast and means for tilting the scoop to forwardly and rearwardly inclined positions.

3. In vehicle storing means having storage compartments, a comon carrier for selectively transporting vehicles to and from the compartments, said common carrier comprising a lift truck having an upright mast, a scoop vertically movable upon the mast, the scoop extending forwardly from the mast and being of sufficient size to receive an automobile thereon, an abutment at the inner end of the scoop for contact with the bumper of an automobile, an angular stop plate pivotally mounted upon the scoop and adapted to be tilted to operative position by a wheel of the vehicle passing thereover, a spring loaded latch bolt mounted upon the scoop and adapted to normally engage over the rear end of the stop plate when the stop plate is in operative position, an operating lever fulcrumed intermediate its ends upon the scoop, the lower end of said operating lever normally projecting below the bottom of the scoop, and a link connecting said latch bolt to the upper end of said operating lever for automatically releasing the latch bolt when the bottom of the scoop is moved into contact with a horizontal surface, means for moving the scoop vertically upon the mast, and means for tilting the scoop to forwardly and rearwardly inclined positions.

4. In vehicle storing means having storage compartments, a common carrier for selectively transporting vehicles to and from the compartments, said common carrier comprising a lift truck having an upright mast, a scoop vertically movable upon the mast, the scoop extending forwardly from the mast and being of sufficient size to receive an automobile thereon, an abutment at the inner end of the scoop for contact with the bumper of an automobile, curbs upon the longitudinal edges of the scoop for wheel alignment of an automobile, an angular stop plate pivotally mounted upon the scoop and adapted to be tilted to operative position by a wheel of the vehicle passing thereover, a spring loaded latch bolt mounted upon the scoop and adapted to normally engage over the rear end of the stop plate when the stop plate is in operative position, an operating lever fulcrumed intermediate its ends upon the scoop, the lower end of said operating lever normally projecting below the bottom of the scoop, and a link connecting said latch bolt to the upper end of said operating lever for automatically releasing the latch bolt when the bottom of the scoop is moved into contact with a horizontal surface, means for moving the scoop vertically upon the mast, and means for tilting the scoop to forwardly and rearwardly inclined positions.

5. In vehicle storing means having storage compartments, a common carrier for selectively transporting vehicles to and from the compartments, said common carrier comprising a lift truck having an upright mast, means for tilting said mast forward and backward, a scoop vertically movable upon the mast, the scoop extending forwardly from the mast and being of sufficient size to receive an automobile thereon, an angular stop plate pivotally mounted upon the scoop and adapted to be tilted to operative position by a wheel of the vehicle passing thereover, a spring loaded latch bolt mounted upon the scoop and adapted to normally engage over the rear end of the stop plate when the stop plate is in operative position, an operating lever fulcrumed intermediate its ends upon the scoop, the lower end of said operating lever normally projecting below the bottom of the scoop, and a link connecting said latch bolt to the upper end of said operating lever for automatically releasing the latch bolt when the bottom of the scoop is moved into contact with a horizontal surface, and means for moving the scoop vertically upon the mast.

6. In vehicle storing means having storage compartments, a common carrier for selectively transporting vehicles to and from the compartments, said common carrier comprising a lift truck having an upright mast, means for tilting said mast forward and backward, a scoop vertically movable upon the mast, the scoop extending forwardly from the mast and being of sufficient size to receive an automobile thereon, curbs upon the longitudinal edges of the scoop for wheel alignment of an automobile, an angular stop plate pivotally mounted upon the scoop and adapted to be tilted to operative position by a wheel of the vehicle passing thereover, a spring loaded latch bolt mounted upon the scoop and adapted to normally engage over the rear end of the stop plate when the stop plate is in operative position, an operating lever fulcrumed intermediate its ends upon the scoop, the lower end of said operating lever normally projecting below the bottom of the scoop, and a link connecting said latch bolt to the upper end of said operating lever for automatically releasing the latch bolt when the bottom of the scoop is moved into contact with a horizontal surface, and means for moving the scoop vertically upon the mast.

7. In vehicle storing means having storage compartments, a common carrier for selectively transporting vehicles to and from the compartments, said common carrier comprising a lift truck having an upright mast, a scoop comprising a back member verticaly movable upon the mast and a horizontal member hinged relative to the back member, said horizontal scoop member extending forwardly from the mast and being of sufficient size to receive an automobile thereon, an angular stop plate pivotally mounted upon the scoop and adapted to be tilted to operative position by a wheel of the vehicle passing thereover, a spring loaded latch bolt mounted upon the scoop and adapted to normally engage over the rear end of the stop plate when the stop plate is in operative position, an operating lever fulcrumed intermediate its ends upon the scoop, the lower end of said operating lever normally projecting below the bottom of the scoop, and a link connecting said latch bolt to the upper end of said operating lever for automatically releasing the latch bolt when the bottom of the scoop is moved into contact with a horizontal surface, means for moving the scoop vertically upon the mast and means comprising downwardly and forwardly inclined fluid cylinders hingedly connected to the back member and having piston rods hingedly connected to the forward portion of the horizontal scoop member for tilting the scoop to forwardly and rearwardly inclined positions.

8. In vehicle storing means having storage compartments, a common carrier for selectively transporting vehicles to and from the compartments, said common carrier comprising a lift truck having an upright mast, a scoop comprising a back member vertically movable upon the mast and a horizontal member hinged relative to the back member, said horizontal scoop member extending forwardly from the mast and being of sufficient size to receive an automobile thereon, an angular stop plate pivotally mounted upon the scoop and adapted to be tilted to operative position by a wheel of the vehicle passing thereover, a spring loaded latch bolt mounted upon the scoop and adapted to normally engage over the rear end of the stop plate when the stop plate is in operative position, an operating lever fulcrumed intermediate its ends upon the scoop, the lower end of said operating lever normally projecting below the bottom of the scoop, and a link connecting said latch bolt to the upper end of said operating lever for automatically releasing the latch bolt when the bottom of the scoop is moved into contact with a horizontal surface, curbs upon the longitudinal edges of the scoop for vehicle alignment, means for moving the scoop vertically upon the mast and means comprising downwardly and forwardly inclined fluid cylinders hingedly connected to the back member and having piston rods hingedly connected to the forward portion of the horizontal scoop member for tilting the scoop to forwardly and rearwardly inclined positions.

References Cited in the file of this patent

UNITED STATES PATENTS

| | | |
|---|---|---|
| 1,288,567 | Hall | Dec. 24, 1918 |
| 1,816,053 | McGavin | July 28, 1931 |
| 1,874,859 | Been | Aug. 30, 1932 |
| 1,925,442 | Fournier | Sept. 5, 1933 |
| 1,931,803 | Perkins et al. | Oct. 24, 1933 |
| 1,936,107 | Cunneen | Nov. 21, 1933 |
| 1,946,320 | Hollister | Feb. 6, 1934 |
| 2,208,954 | Weiss | July 23, 1940 |
| 2,394,693 | Golrick | Feb. 12, 1946 |
| 2,415,015 | Lull | Jan. 28, 1947 |
| 2,437,010 | Way | Mar. 2, 1948 |
| 2,553,531 | Graves | May 15, 1951 |
| 2,629,507 | Olson | Feb. 24, 1953 |
| 2,633,260 | Sutherland | Mar. 31, 1953 |
| 2,645,369 | Allan | July 14, 1953 |
| 2,658,638 | Sartin | Nov. 10, 1953 |

FOREIGN PATENTS

| | | |
|---|---|---|
| 434,246 | Germany | Sept. 17, 1926 |

OTHER REFERENCES

Seattle: "Post Intelligencer," page 21, March 28, 1947.